United States Patent [19]

Marres et al.

[11] 4,054,986
[45] Oct. 25, 1977

[54] METHOD OF MOUNTING A WHEEL RETAINING RING ON A WHEEL SUPPORT SHAFT

[75] Inventors: George Marres, Riverton; Loreto B. D'Alesandris, West Hartford, both of Conn.

[73] Assignee: Veeder Industries, Inc., Hartford, Conn.

[21] Appl. No.: 716,590

[22] Filed: Aug. 23, 1976

[51] Int. Cl.² .............................................. B23P 19/00
[52] U.S. Cl. .......................................... 29/434; 29/229;
29/235; 29/450; 264/242; 264/249; 219/234;
235/92 C
[58] Field of Search ................. 29/434, 450, 229, 235;
264/249, 242; 235/92 C; 219/234; 340/379

[56] References Cited

U.S. PATENT DOCUMENTS

| | | | |
|---|---|---|---|
| 1,598,599 | 9/1926 | Buckwalter | 29/434 |
| 2,483,359 | 9/1949 | Bliss | 235/92 C UX |
| 2,684,139 | 7/1954 | Lewis | 29/434 X |
| 2,814,859 | 12/1957 | Erdmann | 29/229 |
| 2,896,845 | 7/1959 | Hansen et al. | 235/92 C UX |
| 3,491,183 | 1/1970 | Brow | 264/249 |
| 3,578,954 | 5/1971 | Barrett | 340/379 X |
| 3,653,118 | 4/1972 | Koivunen | 29/434 |
| 3,866,021 | 2/1975 | Kessler | 235/92 C X |
| 3,935,433 | 1/1976 | Cielaszyk | 235/92 C |

*Primary Examiner*—Charlie T. Moon
*Attorney, Agent, or Firm*—Prutzman, Hayes, Kalb & Chilton

[57] ABSTRACT

Method and apparatus employing induction heating for positively mounting a grip ring on a thermoplastic support shaft of a counter wheel subassembly for retaining a bank of counter wheels on the support shaft with a preselected axial end play.

8 Claims, 2 Drawing Figures

METHOD OF MOUNTING A WHEEL RETAINING RING ON A WHEEL SUPPORT SHAFT

BRIEF SUMMARY OF THE INVENTION

The present invention relates to a new and improved method of mounting a wheel retaining ring at a selected axial position on a wheel support shaft and having notable utility in positively axially retaining a bank of rotatable wheels on its support shaft with a preselected total axial play.

It is a primary aim of the present invention to provide a new and improved retaining ring mounting method of the type described having notable utility with molded plastic wheel and shaft assemblies for positively axially retaining a bank of coaxial plastic wheels on a plastic shaft with a preselected total axial play. In accordance with the retaining ring mounting method of the present invention, a metal grip ring is positively mounted on a plastic wheel support shaft at an axial position thereon providing a preselected wheel end play and so as to maintain the preselected wheel end play under shock or other abnormal loading conditions.

It is another aim of the present invention to provide a new and improved method of mounting a wheel retaining ring on a multiple wheel support shaft useful with small molded plastic shaft and wheel assemblies and which provides for establishing a total wheel end play within a predetermined close tolerance irrespective of axial dimensional variations in the molded plastic wheels. In accordance with the retaining ring mounting method of the present invention, a low cost molded plastic wheel and shaft assembly with a bank of up to six wheels or more and having a predetermined total wheel end play can be assembled economically and on a mass production basis.

It is a further aim of the present invention to provide a new and improved wheel retaining ring mounting method of the type described having notable utility in axially retaining a bank of coaxial gear wheels, for example of the type employed in a printer or counter, with a predetermined end play for axially maintaining each gear wheel in proper intermeshing alignment with an associated gear.

Other objects will be in part obvious and in part pointed out more in detail hereinafter.

A better understanding of the invention will be obtained from the following detailed description and the accompanying drawing of an illustrative application of the invention.

DESCRIPTION OF THE PREFERRED EMBODIMENT

Figure 2:
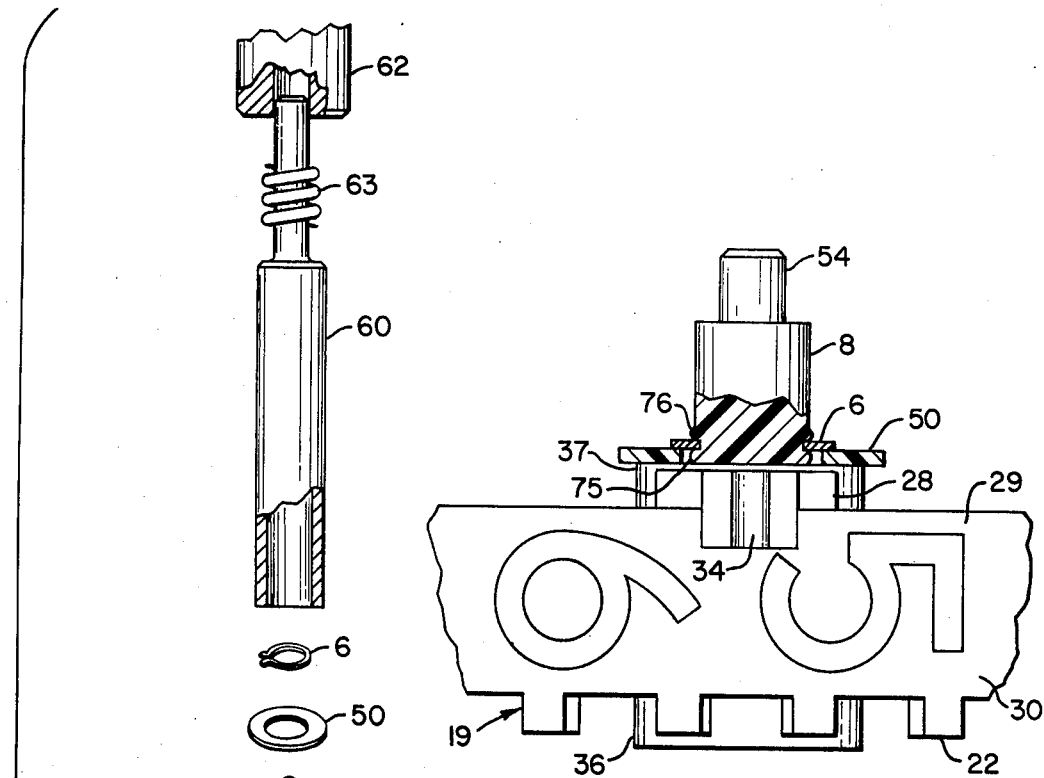
FIG. 2 is an enlarged partial view, partly broken away and partly in section, of the counter wheel subassembly showing the retaining ring mounted on the support shaft in accordance with the present invention.
Figure 1:
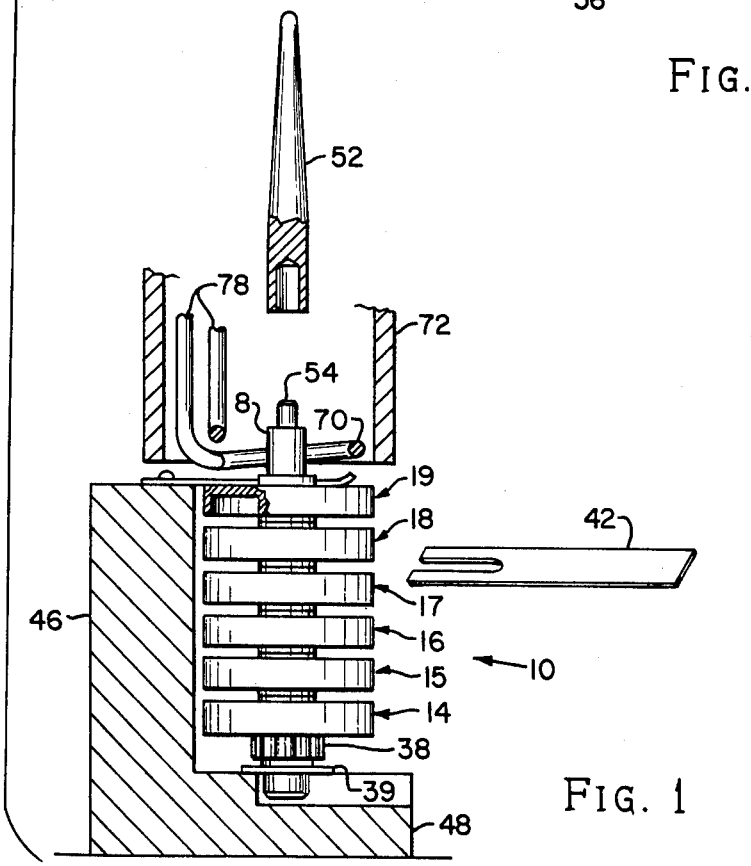
FIG. 1 is an elevation view, partly broken away and partly in section, illustrating a method of mounting a wheel retaining ring on a wheel support shaft of a counter wheel subassembly in accordance with the present invention.

Referring now to the drawing in detail wherein like reference numerals indicate like parts, a method of mounting a wheel retaining ring on a multiple wheel support shaft in accordance with the present invention is shown employed for mounting a retaining ring 6 on a counter wheel support shaft 8 of a counter wheel subassembly 10. The counter wheel subassembly 10 may for example be of the type employed in an electromagnetic counter as shown in U.S. Pat. No. 3,578,954 of James P. Barrett dated May 18, 1971 and entitled "High Speed Magnetic Counter".

The counter wheel subassembly 10 which is shown comprises a bank of six counter wheels 14-19 of ascending order of significance, each freely rotatable and axially slidable on their wheel support shaft 8. The shaft 8 and six counter wheels 14-19 are molded plastic parts, and the five higher order counter wheels 15-19 are preferably identical for economy of manufacture. Each of the five higher order number wheels 15-19 is molded with a twenty-tooth wheel drive gear 22 (shown on the highest order wheel 19 in FIG. 2) for intermeshing engagement with a suitable transfer pinion (not shown) for being indexed by the adjacent lower order wheel in a conventional manner. Also, the five lower order counter wheels 14-18 (and also the highest order counter wheel 19 because it is made identical to the counter wheels 15-18) are formed with integral two-tooth transfer gear segments 28 (shown on the highest order wheel 19 in FIG. 2) for engagement with respective transfer pinions (not shown) for indexing each adjacent higher order counter wheel one count or 36° for each revolution of the adjacent lower order counter wheel. In addition, an edge 29 of the outer cylindrical rim 30 of each counter wheel 14-18 forms a locking ring slotted at 34 between the two-tooth transfer gear segment 28 (as shown on the highest order counter wheel in FIG. 2) for locking the transfer pinion (not shown) between transfers.

The wheels 14-19 have central axially extending hubs 36, 37 engageable with the hubs of the adjacent wheels and which are axially dimensioned to provide the desired wheel spacing. The hub of the lowest order counter wheel 14 is formed with a suitable ratchet wheel 38 (or a drive gear, not shown) for indexing the counter in any conventional manner. Finally, the outer rim 30 of each counter wheel 14-19 bears a 0-9 sequence of equiangularly spaced decimal indicia for registering a multiple place decimal count with the bank of counter wheels in a conventional manner.

The wheel support shaft 8 is integrally molded with a collar or ring 39 at one end thereof to provide an integral retaining shoulder for retaining the bank of coaxial counter wheels 14-19 against axial displacement in one direction on the shaft 8.

An expandable metal grip ring 6 for example of berrylium or phosphor bronze copper, is mounted on the opposite end of the shaft 8 to retain the wheels 14-19 against axial displacement on the shaft 8 in the opposite direction. A preselected wheel end play is established within a predetermined tolerance range (e.g., 0.004 to 0.008 inches), by axially shifting the grip ring 6 inwardly on the shaft 8 against the highest order wheel 19 to take up any remaining end play after a shim 42 of predetermined thickness (e.g., 0.005 inches) is inserted between the hubs 36 and 37 of a pair of adjacent number wheels.

A suitable support jig 46 is provided for holding the wheel and shaft subassembly upright, with the integral shaft collar 39 at the lower end in engagement with a slotted base 48 of the jig for axially supporting the bank of six coaxial counter wheels 14-19 on the shaft collar 39. The shim 42 can be formed as part of the jig 46 or can be separately inserted between the hubs of two of the wheels after the wheels and shaft are preassembled and mounted on the jig 46.

After placing the wheel and shaft assembly on the jig 46 as described, the grip ring 6 is inserted onto the upper end of the shaft 8 along with a spacer washer 50, preferably by using an appropriately tapered aligning pin 52 adapted to be inserted onto a reduced end portion 54 of the shaft 8 and employed to facilitate inserting the washer 50 and grip ring 6 onto the shaft 8. The opening of the washer 50 is dimensioned so that the washer 50 will fall freely down the tapered aligning pin onto the shaft 8 and into engagement with the counter wheel 19. However, the grip ring opening is smaller than the diameter of the shaft 8; consequently, the grip ring 6 is axially shifted down the aligning pin 52 onto the shaft into engagement with the wheel 19 by a tubular ram 60. The tubular ram 60 is slidably mounted on an arbor 62 of a suitable press (not shown), and a compression spring 63 is provided between the arbor 62 and ram 60 so that the grip ring 40 is shifted with a predetermined axial force established by the spring 63 to take up any wheel end play remaining after the shim 42 is inserted. After the grip ring 6 is axially positioned on the shaft 8 as described, the ram 60 is withdrawn and the aligning pin is removed.

The grip ring 40 may be of conventional shape and design adapted to be expanded outwardly slightly for firmly gripping the shaft 8. The inside diameter of the grip ring 6 in its relaxed or unexpanded state is less than the outside diameter of the shaft 8 and such that the grip ring 6 will firmly grip the shaft 8. For example, the grip ring 6 preferably has a diameter approximately 0.004 inch less than the diameter of the shaft 8 in counter applications of the type described wherein the counter wheel shaft has a nominal diameter of approximately one-tenth inch.

A single turn coil 70 having a suitable shield 72 is positioned at the upper end of the jig 46 to surround the upper end of the wheel shaft 8 adjacent the grip ring 6. The coil 70 provides an electromagnetic induction heating source for heating the retaining ring 6 above the plastic temperature of the thermoplastic shaft 8 and thereby permit the grip ring 6 to contract to its normal or relaxed condition into the shaft 8. For that purpose the shaft 8 is made of a suitable thermoplastic material (e.g., DuPont Delrin having a melting point of approximately 175° C) permitting the shaft to be heat softened sufficiently at its periphery by the heated grip ring 6 to flow axially outwardly from the ring 6 and thereupon form inside and outside annular beads or ridges 75, 76 on opposite sides of the ring 6 and an intermediate annulus or groove in the shaft 8 for receiving the ring 6. The thickness of the ring 6 is preferably less than 0.010 inch to prevent the formation of beads 75, 76 having sufficient volume to axially or angularly shift the ring 6 during the induction heating step.

The leads 78 of the induction heating coil 70 are connected to a suitable commercially available RF induction heating source (not shown) operable for establishing an accurately timed RF induction heating cycle for embedding the retaining ring 6 in the shaft 8 as described.

The induction cycle provides for heating the grip ring 6 to a temperature above the melting point of the thermoplastic shaft 8, for example 25°-35° C above the melting point, and so that the peripheral shaft surface engaged by the ring 6 is heated quickly to positively lock the grip ring 6 in place within a very short interval and before there is adequate time for heat penetration into the shaft 8 or to the counter wheel 19. After the induction heating cycle and the grip ring 6 is locked to the shaft 8, the shim 42 is removed and the counter wheel subassembly 10 is removed from the jig 46 for further assembly as part of an electromagnetic counter.

The spacer washer 50 is made of fiberglass or other appropriate insulating material to protect the wheel 19 as well as the washer 50 from being unduly heated and thereby deformed by the heated grip ring 6. Also, the insulating washer 50 is dimensioned to loosely surround the inside annular bead 75 to ensure that the inside bead 75 does not alter the desired total end play of the bank of wheels 14-19 established by the shim 42.

The annular beads or ridges 75, 76 on opposite sides of the grip ring 6 assist in retaining the grip ring in the preselected axial position on the shaft 8, and whereby even a very small grip ring 6 can positively retain the counter wheels on the shaft 8 against up to 50 lbs. shock or other abnormal axial loading on the wheels.

It can be seen that the retaining ring mounting method of the present invention provides for selectively locating a grip ring on a wheel support shaft in a manner establishing a total wheel end play within a predetermined tolerance and for positively locking the grip ring to the shaft for positively retaining the wheels on the shaft.

As will be apparent to persons skilled in the art, various modifications, adaptations and variations of the foregoing specific disclosure can be made without departing from the teachings of the present invention.

We claim:

1. A method of mounting a grip ring at a selected axial position along one generally cylindrical end section of a wheel support shaft of a wheel and shaft assembly comprising a said wheel support shaft, a bank of coaxial wheels mounted on the shaft for rotatable and axial movement thereon, and retaining means at the other end of the shaft for limiting the axial movement of the bank of wheels thereon in one axial direction, the grip ring being mounted on said one generally cylindrical end section of the shaft for limiting the axial movement of the bank of wheels thereon in the opposite axial direction and at a selected axial position along said one end section establishing a predetermined axial play of the bank of wheels thereon, comprising the steps of providing a said wheel and shaft assembly having a wheel support shaft of thermoplastic material at least at said one end section thereof, providing a radially expandable metal grip ring having an internal opening with the ring unexpanded which is slightly less than the diameter of said one generally cylindrical end section of the shaft, inserting the metal grip ring at a selected axial position along said one end section of the shaft establishing said predetermined axial play and with the metal grip ring expanded by the shaft and the ring firmly engaging the shaft, and heating the metal grip ring for heat softening a peripheral portion of the thermoplastic shaft material engaged by the metal grip ring sufficiently to permit the grip ring to contract into the heat softened peripheral portion of the shaft and positively lock the grip ring to the shaft at said selected axial position.

2. A method according to claim 1 of mounting a grip ring on a wheel support shaft of a wheel and shaft assembly, further comprising the step of inserting a thermal insulating washer on said one end of the wheel support shaft for axially separating the grip ring from the bank of coaxial wheels.

3. A method according to claim 1 of mounting a grip ring on a wheel support shaft of a wheel and shaft assembly wherein the coaxial wheels are gear wheels.

4. A method according to claim 1 of mounting a grip ring on a wheel support shaft of a wheel and shaft assembly wherein the coaxial wheels are molded plastic wheels with integral coaxial gear elements respectively.

5. A method according to claim 1 of mounting a grip ring on a wheel support shaft of a wheel and shaft assembly wherein the grip ring is inserted at a selected axial position along said one end section of the shaft by temporarily inserting on the wheel support shaft a spacer having a predetermined axial dimension substantially establishing said predetermined axial play and inserting the grip ring along said one end section of the shaft to a selected axial position retaining the bank of wheels against substantial additional axial play.

6. A method of mounting a grip ring on one end of a counter wheel support shaft of a counter wheel and shaft assembly comprising said counter wheel support shaft, a bank of molded plastic coaxial counter wheels of ascending order mounted on the shaft for rotatable and axial movement thereon, and retaining means at the other end of the shaft for positively limiting the axial movement of the bank of coaxial counter wheels thereon in one axial direction, the grip ring being mounted on said one end of the shaft for limiting the axial movement of the bank of counter wheels thereon in the opposite axial direction and at a selected axial position to establish a predetermined axial play of the wheels thereon, each pair of adjacent counter wheels of higher and lower order having respectively a wheel drive gear and a combination transfer gear segment and locking ring for engagement with an intermediate mutilated transfer pinion, comprising the steps of providing a said counter wheel and shaft assembly having a counter wheel support shaft of thermoplastic material with a predetermined melting point, providing a radially expandable metal grip ring having an internal diameter with the ring unexpanded slightly less than the diameter of the wheel support shaft, inserting the metal grip ring onto said one end of the shaft to an axial position thereon establishing said predetermined axial play and with the metal grip ring expanded by the shaft and firmly engaging a peripheral portion of the shaft at said axial position, and induction heating the metal grip ring above the predetermined melting point of the thermoplastic shaft for a short interval for heat softening said peripheral portion of the shaft engaged by the metal grip ring sufficiently to permit the grip ring to contract into the heat softened peripheral portion of the shaft and force the thermoplastic material axially therefrom and positively lock the grip ring to the shaft at said selected axial position.

7. A method according to claim 6 of mounting a grip ring on one end of a counter wheel support shaft of a counter wheel and shaft assembly, wherein the metal grip ring has an axial thickness no greater than 0.010 inch.

8. A method according to claim 6 of mounting a grip ring on one end of a counter wheel support shaft of a counter wheel and shaft assembly, wherein the heated grip ring forces the thermoplastic material axially therefrom to form annular ridges on both sides of the grip ring.

* * * * *